July 30, 1968  B. DAHLLÖF  3,394,411
DEVICE FOR REDUCING NOISE IN PIPES, ESPECIALLY
FOR WATER UNDER PRESSURE
Filed June 29, 1964  2 Sheets-Sheet 1
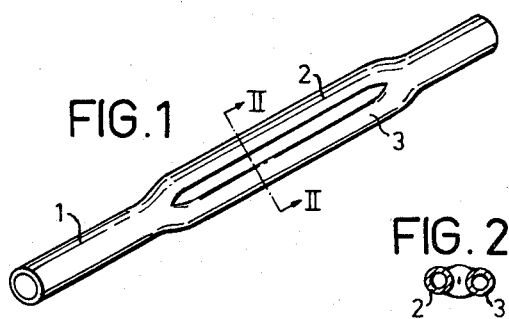
INVENTOR.
Bertil Dahllöf
BY
Pierce, Scheffler & Parker
atty's July 30, 1968     B. DAHLLÖF     3,394,411
DEVICE FOR REDUCING NOISE IN PIPES, ESPECIALLY
FOR WATER UNDER PRESSURE
Filed June 29, 1964     2 Sheets-Sheet 2

INVENTOR.
Bertil Dahllöf,
BY
Pierce, Scheffler & Parker
his Attorneys

United States Patent Office 3,394,411
Patented July 30, 1968

3,394,411
DEVICE FOR REDUCING NOISE IN PIPES, ESPECIALLY FOR WATER UNDER PRESSURE
Bertil Dahllöf, Gustavsberg, Sweden, assignor to AB Gustavsbergs Fabriker, a corporation of Sweden
Filed June 29, 1964, Ser. No. 378,731
1 Claim. (Cl. 4—1)

It is a known fact that especially in large dwelling-houses the noise created by the use of the water supply system is extremely annoying. Noise arises when water is let into bath-tubs, wash-basins, kitchen sinks etc. and when flushing tanks of water-closets are filled, and is to a great extent the result of the strong turbulent flow through the valve which determines the flow. As a matter of fact, the pressure drop in this valve amounts to a value substantially corresponding to the total superatmospheric pressure in the water supply system. In big towns this superatmospheric pressure must be comparatively high, and in skyscrapers special devices have to be used to further increase the water pressure to ensure satisfactory supply of water to the uppermost stories.

The pressure prevailing in a water supply system acts to force water to the various places of consumption, but at these places the high superatmospheric pressure usually involves inconveniences and complications. For example, if in case of a water-closet a filling time of one minute is desired and if the pressure in the system amounts to 85 p.s.i. gauge, the water current has to be very considerably restricted so that the cross sectional area at the restricted place amounts to only a few square millimetres. The strong turbulence occurring at the restricted place results in a very loud noise.

This invention is based upon the conception that the pressure at the tapping place should be lowered in a manner which does not give rise to annoying noises. According to the invention a device for reducing noise in pipes, especially pipes for water under pressure, is characterized in its broadest aspect in that at tapping places, restricted places and the like there is inserted a pipe portion exerting a resistance which is adapted to the pressure in the pipe system and the desired maximum capacity in such a way that at least a substantial part of the pressure drop is consumed in said pipe portion which is of a cross-sectional shape having a hydraulic radius smaller than the hydraulic radius of a circular cross-section of equal area.

The cross-sectional shape and length of said pipe portion are designed so that the flow through the portion is at least substantially laminar so that it does not cause substantial noise.

If in the above-named example a pipe portion of circular cross-section exerting a resistance sufficient to lower the pressure to the required extent ahead of the flushing tank would be inserted ahead of the water-closet, it would be necessary either to use a pipe having a length of quite a number of metres or to insert a pipe portion having so small a cross-sectional area that the desired amount of water per unit of time could not pass through the pipe portion. This is due to the fact that the resistance to flow in a pipe of circular cross-section is low as compared with the resistance to flow in pipes of other cross-sectional shapes because the ratio of the cross-sectional area to the circumference is a maximum. By using a cross-sectional shape other than circular and maintaining a large cross-sectional area the frictional resistance between the flowing water and the wall of the pipe can be increased to such an extent that the required reduction of pressure is obtained along a distance which need not amount to more than one or a few decimeters.

According to regulations regarding water-closets the flushing tank has to be connected to the water supply system by means of a stop valve so that eventual repairs of the flush valve or the like can be made without the necessity of cutting off the entire piping system. In many cases this stop valve is constructed to serve also as a restriction valve by means of which the supply of water to the tank can be adjusted to a suitable value. For a supply of 9 litres the valve is usually adjusted such that the filling time is 60 to 90 seconds. Once the valve has been adjusted it need not be further manipulated unless the supply for some reason has to be temporarily cut off. In view thereof, the control valve can advantageously be replaced by a pipe portion devised in accordance with the invention and forming a connection pipe between the flushing tank and the water supply system, and by a valve serving exclusively as a stop valve which in this case has no controlling function, but is either completely closed or completely open and the flow area of which is great enough to have no restricting action, the flow being substantially exclusively determined by the resistance in the connecting pipe. The last-named pipe is in turn adapted to the prevailing water pressure and to a possible resistance in the flush valve such as to obtain the desired filling time. As an example it may be mentioned that a very low sound intensity has been obtained by means of a connecting pipe consisting of two pipes connected in parallel. The length of each of said two pipes was 50 centimetres and the inside diameter of the circular pipes was 3 millimetres, and the water pressure was 85 p.s.i. gauge, the supply was 9 litres and the filling time 60 seconds.

In a corresponding manner in other cases restricted places of constant or definitely adjusted area may be replaced by a pipe portion according to the invention in connection with all pipe systems where noise problems are involved, for instance in closed circulation systems, such as heating systems, in which in certain cases noise is likely to occur at the individual restriction devices in connection with each radiator.

Taps for wash-basins, kitchen sinks and the like are usually overdimensioned such that in their open position the flow therethrough becomes too intensive, this is the case especially in towns where a comparatively high water pressure is used. In this case the velocity of the outflow may be so high that the water jet after having been deflected at the bottom of a wash-basin passes along a sidewall and spurts up over the top edge thereof. In any case too high a velocity results in an undesirable formation of splashes. For this reason the pipe portion according to the invention is advantageously dimensioned such as to determine the maximum flow through a valve controlling a tapping place or the like. A flow of 10 to 15 litres per minute is quite sufficient for filling washbasins or the like, and for this reason the pipe portion is suitably adapted at the most to deliver this flow which consequently can be obtained before the tap is entirely opened.

In principle, it is immaterial whether the pipe portion according to the invention is inserted upstream or downstream relative to the noise-making restricted place or the like. In connection with a conventional tap it is of course quite natural to insert the pipe portion ahead of the tap, but for instance in case of a water-closet, the pipe portion may be inserted ahead of or after the stop valve.

An embodiment of a pipe portion according to the invention is illustrated in the annexed drawing. FIG. 1 is a perspective view of a pipe portion according to the invention;

FIG. 2 is a sectional view on line 2—2 of FIG. 1; and

Figure 3:
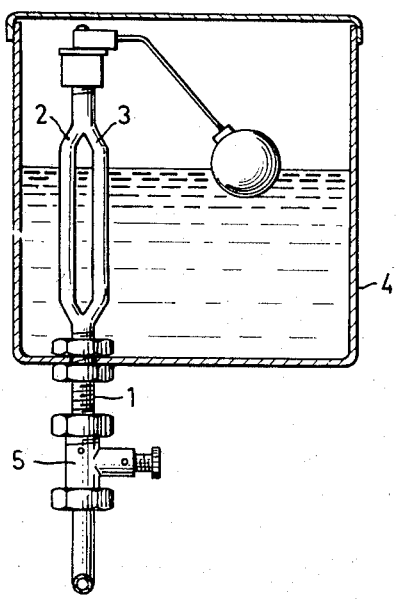
FIG. 3 is a front elevational view, partially in section of a flushing tank of a water closet, including the aforesaid noise-reducing bifurcated pipe portion in the water supply line.

Referring to the drawings 1 is a pipe of circular cross-section and preferably consisting of soft copper. The two end portions of the pipe 1 are connected by smaller parallel pipes 2 and 3 also of circular cross-section, the sum of the cross-sectional areas of the two pipes 2 and 3 being less than the cross-sectional area of the pipe 1. The transition between the ends of the pipes 2 and 3 and the ends of the pipe 1 are streamlined and without any abrupt change of cross-sectional area.

In practical application of the invention pipes having the illustrated cross-sectional shape are manufactured in quantities in different total lengths and with varying lengths of the pipes 2 and 3. It is an easy matter empirically to determine definitely that for instance in case of a certain tap or certain water-closet at a certain water pressure, a certain length of the pipes 2 and 3 is required to obtain the desired reduction of noise while maintaining other desired conditions. For instance, in housing production the type of the pipe for each tap etc., can be predetermined. As far as the pipe fitter is concerned, these pipes do not involve any complication because they are provided with end portions of circular cross-section which, if required, can be shortened by cutting in the same way as in case of conventional copper pipes.

The pipes 2 and 3 preferably are of substantially constant cross-sectional shape, but minor changes of the shape are permissable without inconvenience and without loss of the intended effect. Bending of the pipe during installation is liable to cause formation of the cross sectional shape thereof, but since there are no abrupt changes of the cross-sectional shapes, the transitions will be diffusor-shaped and, consequently, deformation has no noticeable influence upon the flow through the pipe.

FIG. 3 illustrates the inclusion of the above described noise-reducing pipe portion in the water supply line to the flushing tank of a water closet. Supply pipe 1 is provided with a stop valve 5 accessible from outside of the tank.

What is claimed is:
1. A device for reducing noise in a supply pipe, of generally circular cross section, for water under pressure connected to the flushing tank of a water closet, there being a stop valve, intended to be completely open in use, in said supply pipe, said device comprising a multiple branched pipe portion, having in part a non-circular cross section, interposed in said supply pipe between said stop valve and said flushing tank said multiple branched pipe portion having two opposed ends of circular cross-section of essentially the same area as that of the supply pipe said ends being separated from each other by at least two ducts, each having a generally circular cross-section, said ducts merging into said ends without abrupt changes in cross-sectional area, the sum of the cross-sectional areas of said ducts being smaller than the cross-sectional area of said supply pipe and determining the maximum flow through said stop valve, the cross-sectional shape and the length of said multiple branched pipe portion tending to promote laminar flow therethrough.

References Cited

UNITED STATES PATENTS

| | | | |
|---|---|---|---|
| 2,261,028 | 10/1941 | Hopkins | 138—26 |
| 3,170,483 | 2/1965 | Milroy | 181—46 XR |
| 707,712 | 8/1902 | Nethery | 138—44 |
| 1,038,931 | 9/1912 | Michaelson | 181—46 |
| 1,745,492 | 2/1930 | Kelch et al. | 181—46 XR |
| 2,156,296 | 5/1939 | Kline | 138—26 XR |
| 2,238,146 | 4/1941 | Yavitch. | |
| 2,434,846 | 1/1948 | Hagan | 138—26 XR |
| 2,535,660 | 12/1950 | Wynn | 181—46 XR |
| 2,576,610 | 11/1951 | Kunzog | 181—46 XR |
| 2,676,617 | 4/1954 | Felger | 138—26 |
| 2,684,692 | 7/1954 | Hunter et al. | 138—26 |
| 2,790,463 | 4/1957 | Delano et al. | 138—44 |

LAVERNE D. GEIGER, *Primary Examiner.*

B. KILE, *Assistant Examiner.*